United States Patent [19]

Hashimoto

[11] Patent Number: 4,920,559
[45] Date of Patent: Apr. 24, 1990

[54] TELEPHONE ANSWERING DEVICE WITH REMOTE CONTROL TIMING MARK

[75] Inventor: Kazuo Hashimoto, Tokyo, Japan

[73] Assignee: Hashimoto Corporation, Tokyo, Japan

[21] Appl. No.: 138,897

[22] Filed: Dec. 28, 1987

[30] Foreign Application Priority Data

Dec. 27, 1986 [JP] Japan .................. 61-310669

[51] Int. Cl.$^5$ ............................. H04M 1/65
[52] U.S. Cl. .......................... 379/74; 379/77
[58] Field of Search ............... 379/74, 76, 77

[56] References Cited

U.S. PATENT DOCUMENTS

| | | | |
|---|---|---|---|
| 3,383,469 | 5/1968 | Goodman | 379/74 |
| 3,730,997 | 5/1973 | Konno | 379/74 |
| 4,201,888 | 5/1980 | Jacobson | 379/74 |
| 4,540,856 | 9/1985 | Fojii et al. | 379/76 |
| 4,596,901 | 6/1986 | Hanscom et al. | 379/76 |

Primary Examiner—Vincent P. Canney
Assistant Examiner—James E. Tomassini
Attorney, Agent, or Firm—Lowe, Price, LeBlanc, Becker & Shur

[57] ABSTRACT

In a conventional telephone answering device with a remote retrieval function, the user sends a remote control signal during anytime of the playback of the outgoing message in order to retrieve the incoming message from the remote location, and so the security code for security is required. According to the present invention, in order to increase the accuracy of security and to make the remote control operation easier, one short word or long word of the outgoing message can be used as a timing mark for sending the remote control signal for not only experienced people but also unexperienced people. If the user feels that the recorded message was leaked to other people, it is possible to change easily the timing mark from the remote location. And further, the user can easily operate even if he uses plurality of timing marks for more security.

5 Claims, 4 Drawing Sheets

PULSE OF TURNING SWITCH

MARKING SWITCH

TELEPHONE ANSWERING DEVICE WITH REMOTE CONTROL TIMING MARK

BACKGROUND OF THE INVENTION

The present invention relates to a telephone answering device with a remote retrieval function.

A conventional telephone answering device with remote retrieval function is disclosed, for instance, in JAPAN No. S42-12444 B1 which is related to the present application of the same applicant.

In the conventional device, the changing of the remote control method when necessary on that occasion is physically limited because it is necessary to take a step of, for instance, putting a conductive foil on the mark position. And further, the work for said step itself is very complicated.

SUMMARY OF THE INVENTION

It is a first object of the present invention to provide a telephone answering device having remote control timing mark with a microcomputer control system, wherein by storing the timing mark position during the special word and phrase which should be used as security code, it is possible to determine the position of a signal area in which a remote control signal can be accepted, so that the work itself for registering the timing mark can be made easier for the user.

It is a second object of the present invention to provide a telephone answering device having a remote control timing mark with a microcomputer control system, wherein by storing the timing mark position during the special word and phrase which should be used as security code, it is possible to change or move said security code without any physical limit, because it does not have any metal foil or other physical marking means.

It is a third object of the present invention to provide a telephone answering device having a remote control timing mark with a microcomputer control system, wherein by storing the timing mark position during a special word and phrase which should be used as security code, the user can send a remote signal at the listening point of the special word and phrase which was selected by himself when he registers the timing mark.

The above and other objects, features and advantageous of the present invention will become more apparent from the following description when taken in conjunction with the accompanying drawings in which preferred embodiments of the present invention is shown by way of illustrative example.

DESCRIPTION OF THE PREFERRED EMBODIMENTS

Operations in the embodiments will be described with reference to the drawings.

Figure 1:
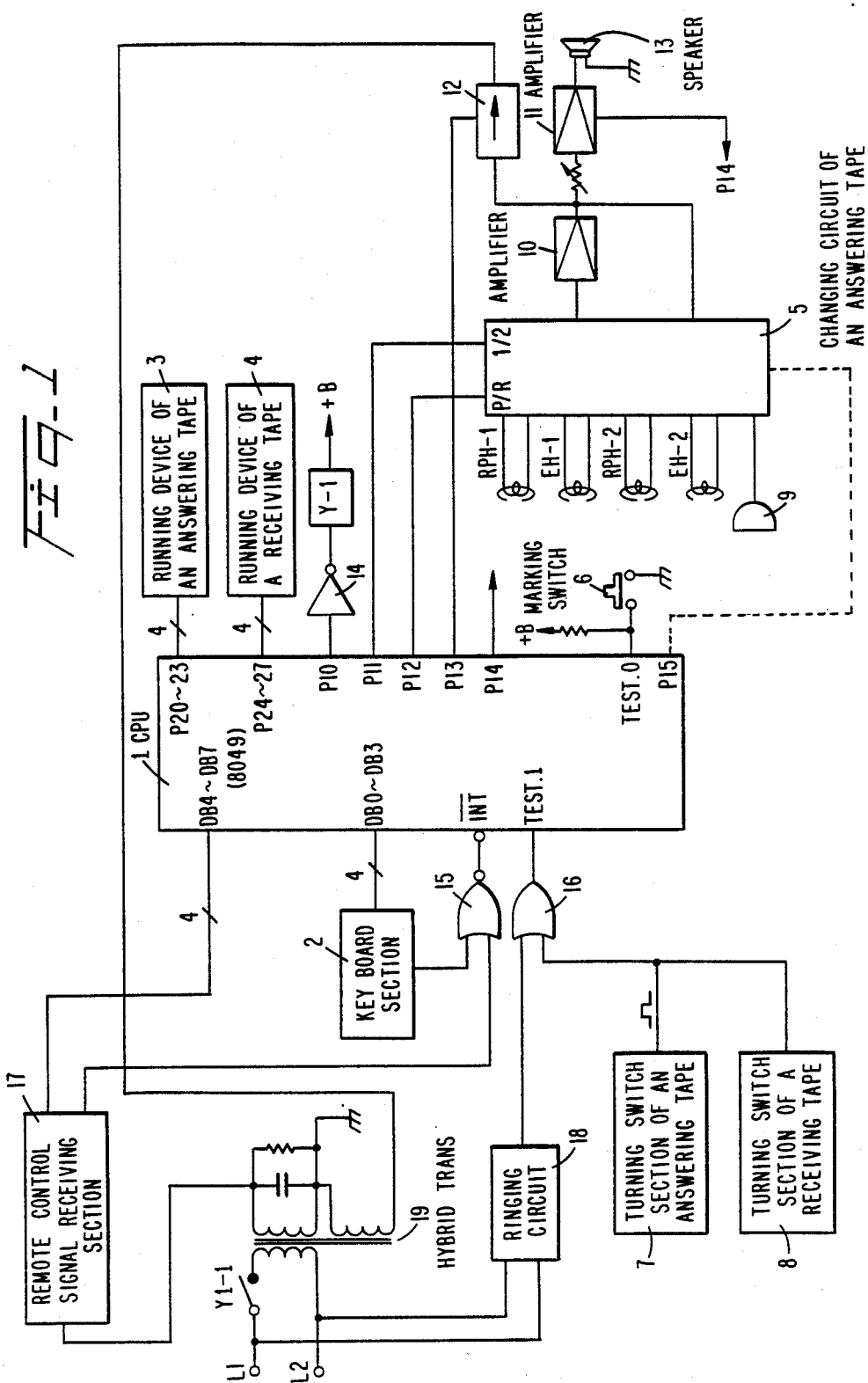
FIG. 1 is a circuit diagram which shows the preferred embodiment of the present invention.

Referring to FIG. 1 which shows a first embodiment of the present invention, reference numeral 1 denotes a microprocessor (hereinafter called as CPU), such as a INTEL one chip microcomputer 8049, as used in the present embodiment, wherein data buses DB0 to DB7 are used as input terminals, P10 to P15 as input/output ports, and P20 to P27 as output ports.

Reference symbol INT denotes an interrupt terminal. The interrupt is supplied by output of a keyboard section 2 and a remote control signal receiving section 17 described later. Reference symbol TEST1 denotes a test terminal which is used for detecting a ringing signal through a ringing circuit 18 described later and for detecting the beginning position (ending position) of an outgoing message (hereinafter called as OGM) tape T-1 (not shown) and an incoming message (hereinafter called as ICM) tape (not shown).

Another test terminal TEST0 is an input terminal for a switch 6 for marking which is used for registering a mark position at the special word in the OGM on the OGM tape of the present invention.

Said keyboard section 2 includes some keys, for instance, a key for controlling the OGM tape or the ICM tape, and a key for setting the device to the automatic answering and recording mode. If said switch 6 for marking is operated in the playback mode after the push-on of a playback key in the keyboard section 2 which is used for playing back the OGM T-1, the mark position can be registered.

Reference numeral 3 denotes an OGM tape driving mechanism which controls rewinding, playback, fast forward, stop or the like of the OGM tape T-1 in response to four signal lines form said CPU 1. And reference numeral 4 denotes an ICM tape driving mechanism.

Reference numeral 5 denotes a recording/playback switching circuit of the OGM tape and ICM tape. When a terminal ½ is H level, heads RPH-1 and BH-1 for the OGM tape are selected. Further, when a terminal P/R is H level, the selected heads described above are connected in the playback mode. When said terminal P/R is L level, said heads are connected in the recording mode.

Reference numeral 7 denotes a rotary switch section for OGM tape which is turned on and off repeatedly according to the driving of said tape. Said rotary switch section stores the count which shows the driving amount of tape at the time when it is turned on and off, and detects the beginning and ending points of the tape.

Reference numeral 8 denotes a rotary switch section of the ICM tape; 9 denotes a microphone for recording the OGM; 10 denotes an amplifier; 11 denotes an amplifier for electric power; 12 denotes an analog switch; and 13 denotes a loudspeaker.

Reference numeral 14 denotes a driver. Reference symbol Y-1 denotes a relay for engaging the telephone line. Reference numeral 15 denotes a NOR gate and 16 denotes an OR gate. Reference numeral 17 denotes a remote control signal receiving section. In the present embodiment, the DTMF tone (hereinafter called as PB tone) of push phone is used as a remote control signal. Reference numeral 18 denotes a ringing circuit for detecting a ringing signal; and 19 denotes a hybrid transformer.

Operations of the present device will be now described.

First, the OGM is recorded on the OGM tape 5 through the microphone 9 after pushing a key for recording in the keyboard section 2. This operation is well known and the detailed description is omitted.

The operation for storing the mark position during the playback of the OGM recorded as described above will be now described.

Figure 2:
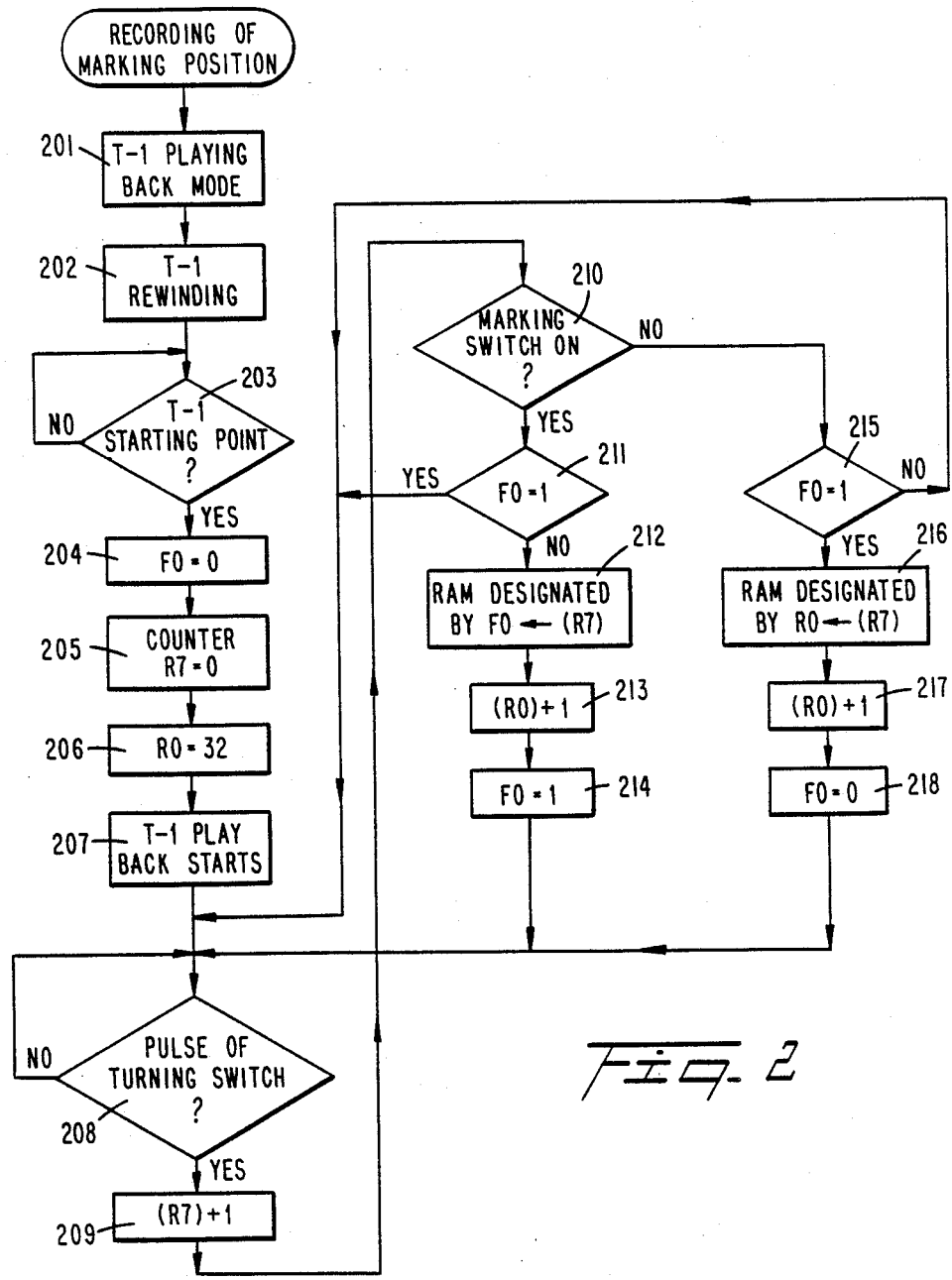
FIG. 2 is a flow chart which shows the recording operation of the mark position during the playback of the outgoing message.

When the playback key of the keyboard section 2 is pushed, the program proceeds to step 201 in the flow chart shown in FIG. 2. Now, the output ports in the CPU 1, P11 becomes H level and P12 becomes H level, and then the recording/playback switching circuit 5 is switched to the playback mode of the OGM tape T-1.

In step 202, the OGM tape T-1 starts rewinding through the OGM tape driving mechanism 3.

In step 203, the beginning position of the OGM tape is detected by checking the output pulse from the rotary switch section 7. When the OGM tape reaches its beginning position, the program proceeds to step 204, and now a flag, for instance, F0 is cleared. And a register, for instance, R7 is cleared as a counter for counting the output pulse from the rotary switch section 7 at the playback described later.

In next step 206, a register R0 is set to 32 as a pointer of the memory (RAM) for storing the tape position by the output pulse from said rotary switch section 7.

In step 207, the OGM tape T-1 is switched to the playback mode, and the recorded OGM is amplified through the loudspeaker 13. Its detailed description is omitted.

When the playback is started as described above, in step 208 the detection of the pulse from the rotary switch section 7 is operated.

When said pulse is detected, the count of said register R7 is incremented by one in step 209, and in step 210 is checked whether or not the switch 6 for marking is pushed.

When the switch 6 for marking is pushed during the announcement of any specific word of the OGM, the program proceeds from step 210 to step 211.

Figure 3A:
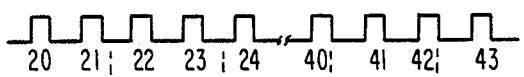
FIG. 3(A) is a diagram which shows the pulse from the rotary stitch section.
Figure 3B:
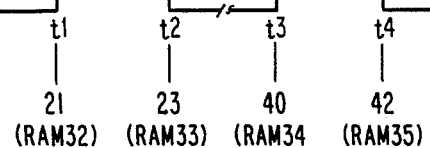
FIG. 3(B) is a diagram which shows the period of time of turning on the marking switch.

As the flag F0 becomes "0" in above step 204, the program also proceeds from step 211 to step 212. The count of the register R7 is stored into a first RAM which above register R0 specifies, RAM32 (because in the present embodiment said first RAM is the 32nd RAM). With reference to FIGS. 3(A) and 3(B), the pulse from the rotary switch section 7 is shown in FIG. 3(A) and the period of time of push-on the switch 6 for marking is shown in FIG. 3(B). If the pulse from the rotary switch section 7 at the time of push-on said switch 6 at t1 in FIG. 3(B) is the 21st pulse after the OGM is switched to the playback mode, the count "21" is stored into the memory RAM32.

After the count "21" is stored into the RAM32 as described above, in step 213 the count of the register R0 is incremented by one. Thus a RAM33 is specified as a next memory RAM.

Further, in step 214, by setting the flag F0 to "1", it is stored that the switch 6 for marking is being pushed.

While the flag F0 is set to "1" and the switch 6 for marking is being pushed as described above, the flow chart forms the loop of steps 208, 209, 210, 211 and 208. During said loop, the pulse from the rotary switch section 7 is being counted.

When the switch 6 for marking is released after the predetermined period of time (3 or 4 seconds for an unexperienced remote control operator and 1 or 2 seconds for an experienced operator), the program proceeds from step 210 to step 215 in the flow chart. As the flag F0 is "1", the program further proceeds to step 216 and the count stored in the register R7 is put into the memory RAM33 specified by the register R0 as described above. In the present example shown in FIG. 3(B), the count 23 is stored into the RAM33 at t2. In step 217, next memory RAM is specified by incrementing the count of the register R0 by one. And further, the flag F0 is cleared and it is stored that the switch 6 for marking is released. Now one cycle of operations has been completed.

As described above, several mark positions can be stored into the memory RAM during the announcement of the specific words in the OGM. So, if the remote control signal is sent out at said mark position in the remote control operation described later, the message recorded on the ICM tape can be remotely retrieved.

More particularly, in the example OGM, "Hello, this is telephone No. 421-2266, Hashimoto. We cannot answer you now, so your message will be recorded on our telephone answering device. Please speak your name and message after beep.", above mark positions are stored at words, for instance, "421" and "Hashimoto". As is evident from above description, these mark positions and the limits thereof can be changed voluntarily. So in case of the unexperienced person, if "No." before said specific word "421" or "2" after said "421" is added to said word to broaden its limits, he can more easily operate the remote control operation.

Figure 4:
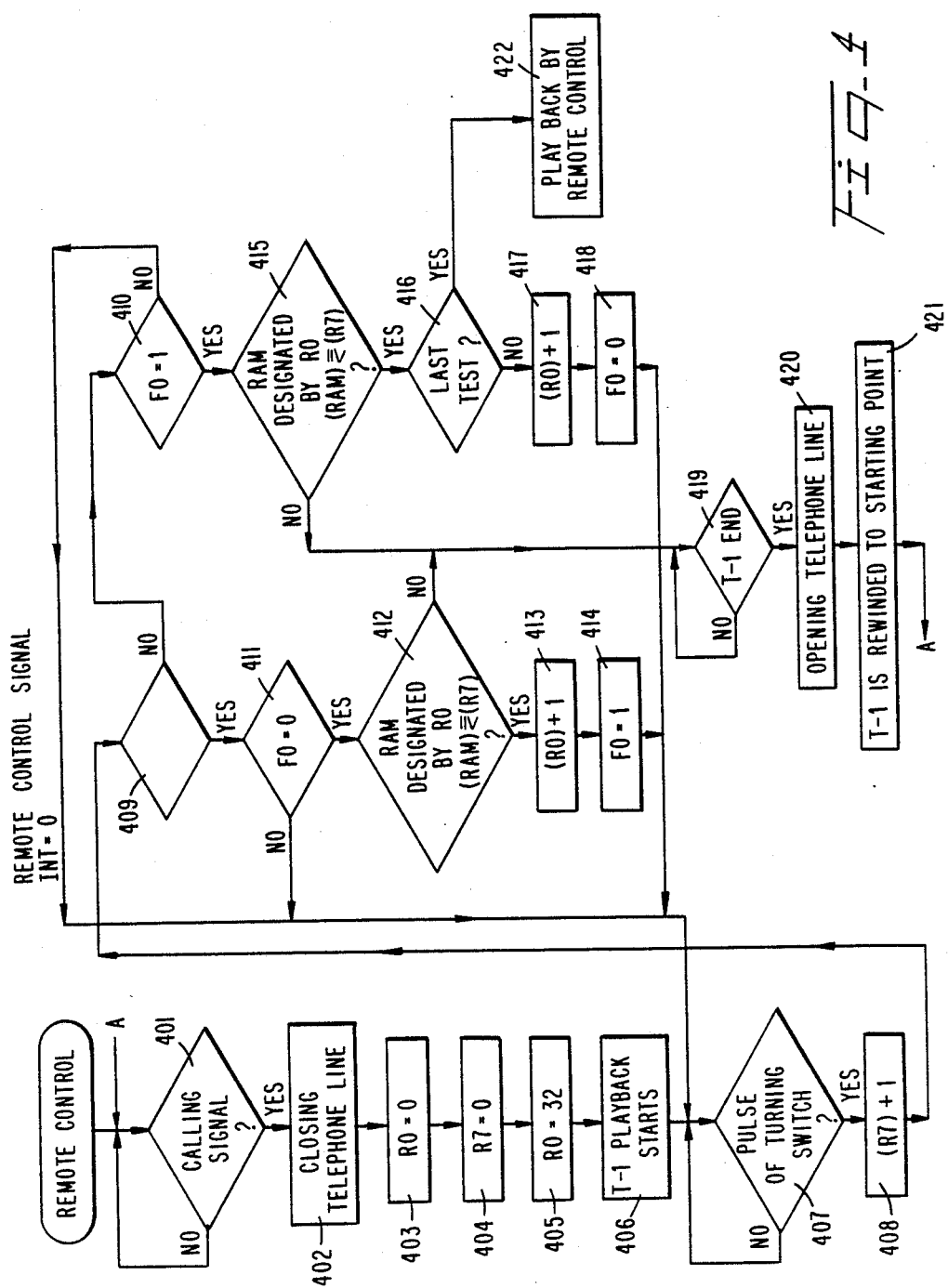
FIG. 4 is a flow chart which shows the remote control operation.

After the mark position is stored during the announcement of the specific word in the OGM as described above, the owner can operate remotely the device at said mark position. Said operation will be now described with reference to the flow chart, FIG. 4.

The description of operation for recording the ICM from the calling party on the ICM tape is omitted because it is well known.

When the owner calls the present device from an outside telephone, the ringing signal is detected by the CPU 1 through the ringing circuit 18 and the OR gate 16 (step 401). Now the output port P10 of the CPU 1 becomes H level and the relay Y-1 is kept operative through the driver 14 to engage the telephone line through the contact y1-1 of the relay Y-1. The ringing signal stops and the voice circuit is established (step 402).

Further, in steps 403 to step 405, above flag F0, and registers R7 and R0 are reset to the original count. Then the OGM tape T-1 is started to send out the OGM to the telephone line through the recording/playback head RPH-1, the recording/playback switching circuit 5, the amplifier 10, the analog switch 12 and the hybrid transformer 19.

When the OGM tape starts, the detection of the pulse from the rotary switch section 7 is operated in step 407 as described above. When the pulse is detected, in step 408 the count of the register R7 is incremented by one. Before the remote control signal comes into, the program returns to said step 407 through steps 409 and 410. This operation is repeated. When the owner starts sending the remote control signal (in the present embodiment PB tone described above) during the announcement of the specific word in the OGM, the PB tone code of said remote control signal is decoded by the remote control signal receiving section 17, and further a part of its output (strobe signal) brings down the interrupt terminal INT of the CPU 1 from H level to L level through the NOR gate 15. This operation is detected in step 409 and the program proceeds to step 411.

As the flag F0 is still "0" in step 411, the program proceeds to next step 412 Now, the count stored into the memory RAM specified by the register R0, first into the RAM32 is compared with the count of the register R7. If said two counts coincide or the count of the register R7 is larger than the count of the RAM32, the checking here results in YES. The count of the RAM32 is "21" in above example shown in FIG. 3(B), so if at the time of starting sending out the remote control signal the count of the register R7 is "21" or more than "21", the program passes through this step 412 and proceeds to next step 413.

In step 413, the count of the register R0 is incremented by one in order to specify the next memory RAM. In step 414, the flag F0 is set to "1". Then the program returns to step 407. Even while the remote control signal is being inputted, the counting of the pulse from the rotary switch section 7 continues. In this case, the loop of steps 407, 408, 409, 411 and 407 is formed.

Now, when the owner stops sending out of the remote control signal at the end of the specific word of the OGM, the interrupt terminal INT becomes "1" (H level) as is evident from above description. The program proceeds from step 409 to 410.

As the flag F0 has been set to "1", the program proceeds from step 410 to step 415. In step 415, the count of the memory RAM specified by the register R0 (RAM33) is compared with the count of the register R7. If the count of the register R7 coincides with the count of the RAM33 or the count of the register R7 is smaller than the count of the RAM33, the checking results in Yes and program passes through this step 415.

Accordingly, in connection with above step 412, if the owner sends out the remote control signal first during the limits of 21 to 23, counts of the pulse from the rotary switch section 7 in the example of FIG. 3(B), the first sending of the remote control signal will pass.

If the timing of sending the remote control signal does not coincide with the announcement of the specific word in the OGM, the program proceeds from step 412 or 415 to step 419 and above checkings result in NO. After detecting the end of the OGM, the telephone line is disengaged and the OGM tape T-1 is rewinded to the beginning position (steps 419, 420 and 421). Then the program returns to step 401 wherein the device is set to the standby mode.

Now, the program passes through above step 415, and then in step 416 checks whether or not it was the last checking. This checking can be done by comparing the number of times of checking with the number of mark positions which is stored into, for instance, a register R6 or a memory RAM. Now, the program proceeds to next step 417. In step 417, a next memory RAM is specified by incrementing the count of the register R0 by one. In step 418, the flag F0 is cleared to be ready for a next incoming remote control signal.

When above operation is repeated as many times as the number of mark positions and each timing of sending remote control signal is completely correct, the program proceeds from step 416 to step 422. So the ICM tape is now rewinded and then remotely retrieved.

And further, if the incoming call from a third party comes into, the beep tone recorded at the end of the OGM is detected by a filter and the interrupt request is supplied by the detection output thereof, so the ICM tape is driven in the recording mode to record the message from the calling party, although this operation is shown in neither the circuit diagram or the flow chart.

Figure 5:
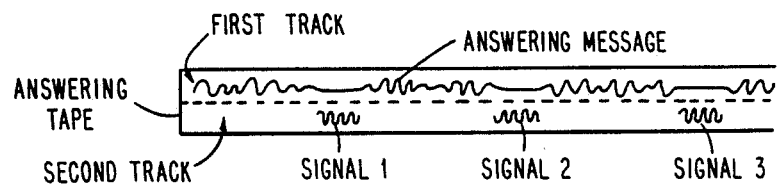
FIG. 5 is a diagram which shows the outgoing message tape in another embodiment.

In above embodiment, the OGM tape T-1 has one track. However, in another embodiment shown in FIG. 5, it is possible to arrange two tracks of the OGM tape. On the first track the OGM is recorded. And by pushing the switch 6 for marking FIG. 1 during the announcement of the specific word of the OGM in the same way as in above first embodiment, signals produced by the program through the output port P15 is applied to a second track head (not shown) through the recording/playback switching circuit 5 as shown in the figure with a wavy line to be recorded on the second track. If the remote control signal is sent out at the remote control operation during the announcement of the specific word in the OGM which was marked by said signal, an AND output of said signal and the remote control signal can be obtained. So the remote control retrieval can be done only if said remote control signal is sent out exactly at every mark position.

As described above, according to the present invention, it is possible to remotely control the telephone answering device to retrieve the message easily and accurately, by using the microcomputer control system to settle the interval between the first mark position and the second mark position as the owner chooses by pushing a same button. Therefore, the present invention is much advantageous in practical use.

Although certain preferred embodiments have been shown and described, it should be understood that many changes and modifications may be made therein without departing from the scope of the invention.

What is claimed is:

1. A telephone answering device, comprising:
  means for recording an outgoing message on an outgoing message recording medium;
  means for confirming the outgoing message;
  a switch for a marking signal which is momentarily turned on during said outgoing message confirming operation;
  means for storing into a first memory means a first marking position on the outgoing message recording medium where said marking switch is turned on during announcement of a specific word which is known only to a user of the device;
  means for storing into a second memory means a second marking position on the outgoing message recording medium where said marking switch is released;
  means for setting the device to the standby mode after said marking positions are stored;
  means for engaging the telephone line in response to a ringing signal which arrives in the standby mode, and for playing back said outgoing message to send out; and
  means for enabling a remote retrieval of an incoming message recording medium in response to a remote control signal which arrives between said first marking position and said second marking position during the playback of said outgoing message.

2. A telephone answering device, according to claim 1, wherein a plurality of above first marking positions and above second marking positions are provided.

3. A telephone answering device, according to claims 1 and 2, wherein any interval between said first marking position and said second marking position can be set according to a period of time of turning on above marking switch.

4. A telephone answering device, according to claim 1, wherein the remote retrieval is disabled in response to the remote control signal which arrives at any other positions except above first marking position and above second marking position.

5. A telephone answering device, comprising:
means for recording an outgoing message on a first track of an outgoing message recording medium;
means for confirming the outgoing message;
a switch for marking signal which is momentarily turned on during said outgoing message confirming operation;
means for starting the recording of a signal on a second track of the outgoing message recording medium from a first marking position where said marking switch is turned on during announcement of a specific word which is known only to a user of the device;
means for releasing the recording of said signal at a second marking position where said marking switch is released; and
means for enabling a remote retrieval of an incoming message recording medium in response to a remote control signal which arrives between said first marking position and said second marking position in said outgoing message.

* * * * *